US012661724B2

(12) United States Patent
Qu et al.

(10) Patent No.: US 12,661,724 B2
(45) Date of Patent: Jun. 23, 2026

(54) ON-MACHINE THREE-DIMENSIONAL PROFILING MACHINING DEVICE AND METHOD FOR COMPLEX CONFIGURATION COMPOSITE

(71) Applicants: CHONGQING UNIVERSITY OF TECHNOLOGY, Chongqing (CN); AEROSPACE RESEARCH INSTITUTE OF MATERIALS & PROCESSING TECHNOLOGY, Beijing (CN); BEIJING INSTITUTE OF ASTRONAUTICAL SYSTEMS ENGINEERING, Beijing (CN)

(72) Inventors: Da Qu, Chongqing (CN); Yuan Gao, Beijing (CN); Ziran Chen, Chongqing (CN); Xiaojing Ma, Beijing (CN); Yibo Zhao, Beijing (CN); Wei Zheng, Beijing (CN); Xingqi Tang, Chongqing (CN); Qiwei Wu, Chongqing (CN); Xiaoqiang Xu, Chongqing (CN)

(73) Assignees: CHONGQING UNIVERSITY OF TECHNOLOGY, Chongqing (CN); AEROSPACE RESEARCH INSTITUTE OF MATERIALS & PROCESSING TECHNOLOGY, Beijing (CN); BEIJING INSTITUTE OF ASTRONAUTICAL SYSTEMS ENGINEERING, Beijing (CN)

( * ) Notice: Subject to any disclaimer, the term of this patent is extended or adjusted under 35 U.S.C. 154(b) by 386 days.

(21) Appl. No.: 18/504,129

(22) Filed: Nov. 7, 2023

(65) Prior Publication Data
US 2024/0173781 A1    May 30, 2024

(30) Foreign Application Priority Data
Nov. 25, 2022    (CN) .......................... 202211487189.2

(51) Int. Cl.
B23C 1/12        (2006.01)
B23C 3/00        (2006.01)
(Continued)

(52) U.S. Cl.
CPC ................ B23C 3/007 (2013.01); B23C 1/12 (2013.01); B23Q 1/0009 (2013.01);
(Continued)

(58) Field of Classification Search
CPC ......... B23C 3/007; B23C 3/122; Y10T 82/22; Y10T 409/306832; Y10T 409/306944;
(Continued)

(56) References Cited

U.S. PATENT DOCUMENTS 5,940,180 A * 8/1999 Ostby ................ B23Q 17/2495
356/498
11,673,256 B2 * 6/2023 Angood ................... B25J 9/023
33/503
(Continued)

FOREIGN PATENT DOCUMENTS

CN          106735347 A  *  5/2017
CN          114042939 A  *  2/2022
(Continued)

*Primary Examiner* — Erica E Cadugan

(57) ABSTRACT

The invention belongs to the technical field of aerospace product machinery manufacturing. Disclosed are on-machine three-dimensional profiling machining device for complex-configured composite material pipelines and an application method thereof. The on-machine three-dimensional profiling of the complex-configured composite material pipelines is In the shape machining device, a precision lifting rod is installed on the linear motion module, and a depth vision system is installed on the precision lifting rod; a precision linear motion table and a radial motion module are installed at the left end of the on-machine measurement hollow machining structure, laser displacement sensor probe, and the eddy current sensor probe is installed on the
(Continued)

left end of the hollow machining structure for on-machine measurement through mounting bolts. The invention has the advantages of high integration, simple operation, convenience and practicality.

6 Claims, 10 Drawing Sheets

(51) Int. Cl.

| | |
|---|---|
| *B23Q 1/00* | (2006.01) |
| *B23Q 1/01* | (2006.01) |
| *B23Q 1/54* | (2006.01) |
| *B23Q 15/02* | (2006.01) |
| *B23Q 15/04* | (2006.01) |
| *B23Q 15/06* | (2006.01) |
| *B23Q 15/12* | (2006.01) |
| *B23Q 15/14* | (2006.01) |
| *B23Q 15/26* | (2006.01) |
| *B23Q 17/20* | (2006.01) |
| *B23Q 17/22* | (2006.01) |
| *B23Q 17/24* | (2006.01) |
| *B23B 5/08* | (2006.01) |
| *B23B 5/16* | (2006.01) |
| *B23B 25/06* | (2006.01) |
| *B23G 1/22* | (2006.01) |

(52) U.S. Cl.
CPC ........... *B23Q 1/5462* (2013.01); *B23Q 15/02* (2013.01); *B23Q 15/04* (2013.01); *B23Q 15/06* (2013.01); *B23Q 15/12* (2013.01); *B23Q 15/26* (2013.01); *B23Q 17/2233* (2013.01); *B23Q 17/2428* (2013.01); *B23Q 17/248* (2013.01); *B23B 5/08* (2013.01); *B23B 5/16* (2013.01); *B23B 25/06* (2013.01); *B23B 2215/72* (2013.01); *B23B 2260/128* (2013.01); *B23B 2270/48* (2013.01); *B23C 2260/76* (2013.01); *B23G 1/225* (2013.01); *B23Q 17/225* (2013.01); *Y10T 82/22* (2015.01); *Y10T 409/307336* (2015.01); *Y10T 409/30756* (2015.01); *Y10T 409/308512* (2015.01); *Y10T 409/309576* (2015.01)

(58) Field of Classification Search
CPC . Y10T 409/307224; Y10T 409/307336; Y10T 409/308008; B23B 5/08; B23B 5/16; B23B 5/167–5/168; B23B 51/103; B23B 2215/72; B23B 25/06; B23B 2260/128; B23B 2270/48; B23B 2260/76; B23G 1/22; B23G 1/225; B23G 1/52; B23G 2240/52; B23Q 1/545–1/5462; B23Q 1/54; B23Q 1/0009; B23Q 15/26; B23Q 15/06; B23Q 15/12; B23Q 15/14
USPC ....... 30/93–102; 82/113; 409/186, 188, 193, 409/195, 207
See application file for complete search history.

(56) References Cited

U.S. PATENT DOCUMENTS

| | | | | |
|---|---|---|---|---|
| 2010/0186210 A1* | 7/2010 | Wildenberg | ........... | B25J 9/1623 |
| | | | | 29/407.05 |
| 2010/0254778 A1* | 10/2010 | Whinnem | ............ | B23Q 1/5462 |
| | | | | 408/72 R |
| 2015/0367474 A1* | 12/2015 | Uekita | ................. | B23Q 15/14 |
| | | | | 408/13 |

FOREIGN PATENT DOCUMENTS

| | | | |
|---|---|---|---|
| CN | 116727702 A | * | 9/2023 |
| CN | 119594853 A | * | 3/2025 |

* cited by examiner

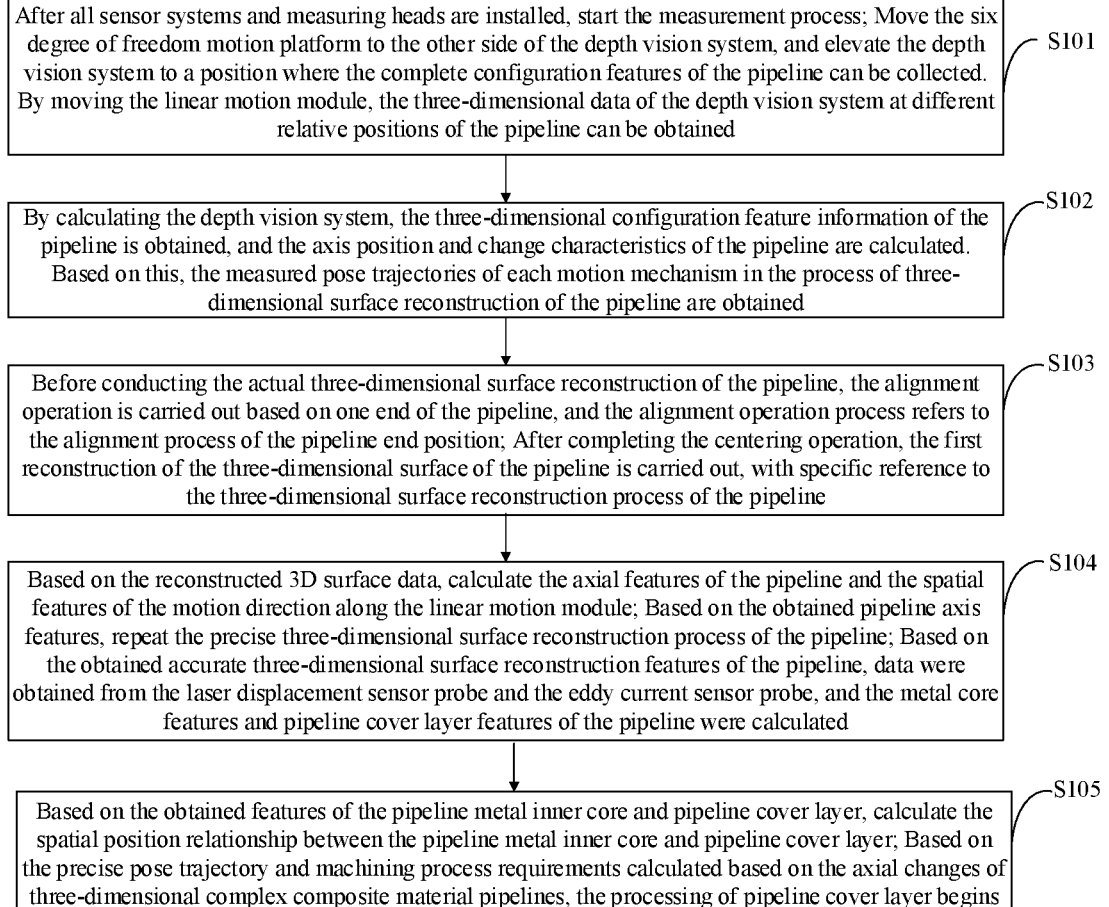

After all sensor systems and measuring heads are installed, start the measurement process; Move the six degree of freedom motion platform to the other side of the depth vision system, and elevate the depth vision system to a position where the complete configuration features of the pipeline can be collected. By moving the linear motion module, the three-dimensional data of the depth vision system at different relative positions of the pipeline can be obtained — S101

By calculating the depth vision system, the three-dimensional configuration feature information of the pipeline is obtained, and the axis position and change characteristics of the pipeline are calculated. Based on this, the measured pose trajectories of each motion mechanism in the process of three-dimensional surface reconstruction of the pipeline are obtained — S102

Before conducting the actual three-dimensional surface reconstruction of the pipeline, the alignment operation is carried out based on one end of the pipeline, and the alignment operation process refers to the alignment process of the pipeline end position; After completing the centering operation, the first reconstruction of the three-dimensional surface of the pipeline is carried out, with specific reference to the three-dimensional surface reconstruction process of the pipeline — S103

Based on the reconstructed 3D surface data, calculate the axial features of the pipeline and the spatial features of the motion direction along the linear motion module; Based on the obtained pipeline axis features, repeat the precise three-dimensional surface reconstruction process of the pipeline; Based on the obtained accurate three-dimensional surface reconstruction features of the pipeline, data were obtained from the laser displacement sensor probe and the eddy current sensor probe, and the metal core features and pipeline cover layer features of the pipeline were calculated — S104

Based on the obtained features of the pipeline metal inner core and pipeline cover layer, calculate the spatial position relationship between the pipeline metal inner core and pipeline cover layer; Based on the precise pose trajectory and machining process requirements calculated based on the axial changes of three-dimensional complex composite material pipelines, the processing of pipeline cover layer begins — S105

Fig. 19

ON-MACHINE THREE-DIMENSIONAL PROFILING MACHINING DEVICE AND METHOD FOR COMPLEX CONFIGURATION COMPOSITE

FIELD

The invention belongs to the technical field of aerospace product machinery manufacturing and in particular relates to an on-machine three-dimensional profiling machining device and method for complex-configured composite material pipelines.

BACKGROUND

At present, composite pipes used in the aerospace field often have complex three-dimensional features, such as variable diameters, bends, non-coincident axes, etc., and are mainly medium to large or even extra-large sizes. When machining such pipelines, traditional machining equipment cannot meet the adaptability requirements. Processes using robots or large machine tools as machining equipment are also difficult to accurately capture and efficiently process the complex structural features of pipelines and occupy a large space. To address the above problems, the existing related technologies are as follows: Patent 1, a three-dimensional surface reconstruction method based on a rotating light field (CN105976431B), which collects images by setting a rotating light field around a rotating body, and then extracts feature points and tracking and matching Obtain the coordinate trajectory, and then obtain the sinusoidal curve and fit it to obtain the three-dimensional coordinates. Patent 1 only provides one method, and it requires feature extraction and tracking matching. It does not fill in the blanks of the three-dimensional coordinate matrix, and it cannot measure the three-dimensional structure of the internal surface with a covering layer. Patent 2, a method for reconstructing three-dimensional objects from spiral sampling light field data (CN202010766903.6). Patent 2 is similar to the method of Patent 1, changing the rotating light field into a spiral sampling light field, and reconstructing the three-dimensional surface through the camera. The method in Patent 2 still has the above-mentioned problems in this field and cannot meet the needs. Patent 3, three-dimensional surface reconstruction method of planar holographic array target based on frequency interference (CN106680796B), invented the three-dimensional surface reconstruction method of planar holographic array target based on frequency interference in the field of radar signal machining: using the same reference distance to sequentially return the broadband to Each frequency point data in the wave is reconstructed into a two-dimensional image, subjected to interference machining, and then phase unwrapped and depth reconstruction is performed to obtain a three-dimensional surface. Patent 3 only provides one method. Although it can achieve the three-dimensional surface reconstruction, it is in a different field, has a single object orientation, and the method is complex, making it difficult to apply it to the on-machine measurement of pipelines in the aerospace field. Patent 4, a structured light visual measurement method of three-dimensional contours of object surfaces based on k-means color clustering (CN201310205209.7), invented a structured light visual measurement method of three-dimensional contours of object surfaces based on k-means color clustering: Determine the spatial straight line of the projected color in the RGB space, calculate the Euclidean distance from the pixel point to the spatial straight line, obtain the color label corresponding to the minimum value, which is the color value corresponding to the pixel point, and then adjust the adaptive parameters to fit the new spatial color Line, k-means clustering is repeatedly iterated to obtain the decoded sequence and then generate a point coordinate matrix to reconstruct the three-dimensional surface. Patent 4 can solve the problem of difficult matching in stereo vision; however, it is difficult to obtain a high-precision three-dimensional lattice for three-dimensional surfaces measured only by visual methods, especially for surface reconstruction of large objects to be measured. Patent 5, non-contact in-position detection device and application method for parts processed by ultra-precision machine tools (CN201610145388.3), non-contact in-position detection device and application method for parts processed by ultra-precision machine tools, with X and Y linear motion axes The movement and calibration can realize two-dimensional or three-dimensional detection of various spherical features. However, Patent 5 is only suitable for small-sized sphere detection and is difficult to apply to medium and large complex three-dimensional structure objects. Patent 6, single-surface three-dimensional reconstruction method, device and system (CN201611019581.9), the invented single-surface three-dimensional reconstruction method, device, and system uses the reflection and polarization analysis of natural light in combination with the triangulation method to obtain heavy structure information. However, this method consists of four parts: normal vector calculation, direction vector calculation, spatial position calculation, and reconstruction. It can be used to reconstruct the surface, but it still cannot obtain the three-dimensional structure of the internal surface with a covering layer. Patent 7, three-dimensional reconstruction method, device and system of transparent target surface (CN201810016530.3) discloses the three-dimensional reconstruction method, device, and system of transparent target surface. However, for non-transparent targets, such as composite material covering layers, it is difficult to meet application needs. Patent 8, a three-dimensional reconstruction method of thread surface based on point cloud data (CN202010859916.8), discloses a three-dimensional reconstruction method of thread surface based on point cloud data, using a rotating platform, a vertical platform, and a laser scanner to reconstruct the thread surface. Thread profile details are reconstructed. However, this method cannot adapt to the three-dimensional surface reconstruction of large-scale objects with complex three-dimensional structures, and it is still unable to obtain the internal surface three-dimensional structure with a covering layer. Patent 9, a fiber-optic interference type three-dimensional imaging detection system for the inner surface of small holes (CN201810286181.7), invented a fiber-optic interference type three-dimensional imaging detection system for the inner surface of small holes. The detection system performs three-dimensional imaging of the inner surface topography of small holes. Imaging and information measurement are not suitable for the three-dimensional surface on-machine detection problems involved in this field. In addition, none of the above-mentioned comparative patents can complete the feature extraction of the pipeline axis characteristics and the spatial posture relationship between the pipeline core and the covering layer.

Through the above analysis, the existing problems and defects of the existing technology are: the machining equipment in the existing technology cannot meet the needs of adaptability, and the technology using robots or large machine tools as machining equipment is also difficult to achieve accurate analysis of the complex structural characteristics of pipelines. Capture and process efficiently with a large footprint. At the same time, none of the existing technologies can complete the feature extraction of the pipeline axis characteristics and the spatial pose relationship between the pipeline core and the covering layer.

SUMMARY

In view of the problems existing in the prior art, the present invention provides an on-machine three-dimensional profiling machining device for complex-configured composite material pipelines and a control method thereof.

The present invention is implemented as follows: an on-machine three-dimensional profiling machining device for complex-configured composite material pipelines. The on-machine three-dimensional profiling machining device for complex-configured composite material pipelines is provided with a linear motion module;

a precision lifting rod is installed on the linear motion module, and a depth vision system is installed on the precision lifting rod; a six-degree-freedom motion platform is installed on the upper end of the linear motion module, and an on-machine measurement hollow machiningmachining structure is installed on the upper end of the six-degree-freedom motion platform;

a workpiece clamping column is installed at the front end of the linear motion module, and a three-dimensional complex configuration composite material pipeline is installed at the end of the workpiece clamping column;

a precision linear motion table and a radial motion module are installed on the rotating cutterhead of the on-machine measurement hollow machining structure, the two precision linear motions are equipped with an eddy current sensor and a laser displacement sensor probe, respectively, the precision linear motion table is equipped with an eddy current sensor probe installed through installation bolts, and the eddy current sensor probe is connected to a sensor premodule through a transmission cable.

Furthermore, the on-machine measurement hollow machining structure is provided with a balance support seat, and the balance support seat is installed on the front end of the on-machine measurement hollow machining structure used to carry the balance of the whole machine. The balance support seat is fixed with a protective end cover through bolts;

the balance support seat is equipped with a magnetic grid sensor wiring hole, and a hollow spindle is installed inside the on-machine measurement hollow machining structure through a first angular contact bearing and a second angular contact bearing, the first angular contact bearing and the second angular contact bearing are clamped by a bearing lock, the bearing lock is equipped with a lifting ring mounting hole;

the on-machine measurement hollow machining structure is equipped with a direct drive motor wiring hole, an aviation plug installation hole and a conductive slip ring fixing hole. The conductive slip ring fixing hole fixes the conductive slip ring stator; a hollow machining structure base is provided at the lower end of the on-machine measurement hollow machining structure. The conductive slip ring stator is installed on the hollow spindle through screws, the conductive slip ring stator is distributed with three 120° differences.

Furthermore, the conductive slip ring stator is fixed through three conductive slip ring fixing holes distributed along the axial direction. The cables drawn from the stator of the conductive slip ring are led from the aviation plug mounting hole to the stepper motor driver;

a conductive slip ring stator, a conductive slip ring mover, a direct drive motor stator, and a direct drive motor mover are installed inside the on-machine measurement hollow machining structure, a magnetic scale and a magnetic grid reading head are installed at the left end of the on-machine measurement hollow machining structure;

the cables of the direct drive motor stator and direct drive motor mover are connected to the driver through the direct drive motor wiring hole and form a closed-loop motion system with the magnetic scale and magnetic grid reading head. The magnetic grid reading head is connected to the driver through the magnetic grid sensor wiring hole;

three radial motion modules are installed on the protective end cover, and the radial motion module is equipped with a linear guide rail, a stepper motors, and a cutter. The cutter is installed at the lower end of the radial motion module.

Furthermore, the depth vision system is equipped with a two-dimensional pan-tilt, a rotation axis, a pitch axis, a camera lens, and a heat dissipation system; the rotation axis is installed on the two-dimensional pan-tilt, the pitch axis is installed on the rotation axis, the camera lens is installed on the pitch axis, and the heat dissipation system is installed on the camera lens.

Furthermore, the six-degree-freedom motion platform is equipped with a hinge, a motion electric cylinder, and a six-degree-freedom motion platform base; the motion electric cylinder is installed on the upper end of the base of the six-degree-freedom motion platform, and the motion electric cylinder is installed on the platform through a hinge; electrical interfaces are equipped on the base of the six-degree-freedom motion platform, and there are six motion electric cylinders and six-degrees-of-freedom motion platform bases respectively.

Furthermore, the three-dimensional complex composite material pipeline is provided with a pipeline metal inner core and a pipeline covering layer; The outer side of the metal inner core of the pipeline is wrapped with a pipeline covering layer.

Furthermore, the precision linear motion table is equipped with a fine-tuning screw, a sensor probe bracket, a locking knob, and a fixed base; the sensor probe bracket is installed on the precision linear motion table, and the sensor probe bracket has an eddy current sensor probe; the sensor probe bracket is connected to the fixed base through a locking knob, and the sensor probe bracket is equipped with a fine-tuning screw.

Another object of the present invention is to provide an on-machine three-dimensional profiling machining device for complex configuration composite material pipelines and an application method of the on-machine three-dimensional profiling machining device for complex configuration composite material pipelines. Application methods of on-machine three-dimensional profiling machining devices for complex-configured composite pipes include:

Step 1: After all sensor systems and probes have been installed, enter the measurement process; the six-degree-of-freedom motion platform is moved to the other side of the depth vision system, and the depth vision system is raised to a position where it can collect the complete configuration characteristics of the pipeline, adjust the linear motion module to achieve three-dimensional data acquisition by the depth vision system at different relative positions in the pipeline;

Step 2: Obtain the three-dimensional configuration feature information of the pipeline through the calculation of the depth vision system and calculate the axis position and change characteristics of the pipeline. Based on the results of calculating the axis position and change characteristics of the pipeline, the three-dimensional surface of the pipeline is obtained. During the reconstruction process, the measured pose trajectories of each kinematic mechanism;

Step 3: Before performing the actual three-dimensional surface reconstruction of the pipeline, perform a centering adjustment based on one end of the pipeline. The centering adjustment process is the pipeline end-centering process; after completing the centering adjustment, start the first pipeline alignment. The three-dimensional surface is reconstructed, specifically the three-dimensional surface reconstruction process of the pipeline;

Step 4: Based on the reconstructed three-dimensional surface data, calculate the pipeline axis characteristics and the spatial characteristics along the motion direction of the linear motion module; based on the obtained pipeline axis characteristics, repeat the accurate pipeline three-dimensional surface reconstruction process; Based on the obtained accurate three-dimensional surface reconstruction characteristics of the pipeline, data were obtained from the laser displacement sensor probe and the eddy current sensor probe respectively, and the characteristics of the metal core of the pipeline and the characteristics of the pipeline covering layer were calculated;

Step 5: Based on the obtained characteristics of the pipeline metal core and the pipeline covering layer, the spatial position relationship between the pipeline metal core and the pipeline covering layer is calculated based on the changes in the axis of the three-dimensional complex configuration composite pipeline According to the precise posture trajectory and machining technology requirements, the machining of the pipeline covering layer begins.

Furthermore, in step three, the specific process of pipeline end centering is as follows:

When centering is performed through the end of the pipeline covering, the sensor probe is a laser displacement sensor probe; when centering is performed through the end of the metal core of the pipeline, the sensor probe is an eddy current sensor probe;

1) Through naked eye observation, adjust the six-degree-of-freedom motion platform to the approximate center position between the hollow main shaft of the device and the end of the pipeline;

2) Control the rotation of the rotating hollow spindle through IPC to bring the sensor probe to the upper position;

3) Adjust the fine-tuning screw of the precision linear motion table so that the distance between the sensor head and the measured object is within the measuring range;

4) Control the rotation of the rotating hollow spindle through IPC to move the sensor probe to the lower position;

5) Determine whether the distance between the sensor probe and the measured object is within the range of the sensor probe; if it is not within the range, repeat 3); the precision linear motion table has a limited stroke, and if the conditions still cannot be met, Then repeat 3); when it is within the measurement range, proceed to the next step;

6) Adjust the fine-tuning screw of the precision linear motion table so that the distance between the sensor probe and the measured object is near the center of the measuring range; when performing alignment measurement, make sure that the distance between the sensor probe and the measured object is still within the sensor range;

7) When the above conditions are met, start recording the distance d 1 between the sensor probe and the measured object at the position;

8) Control the rotation of the rotating hollow spindle through IPC to bring the sensor probe to the upper position;

9) Record the distance d 2 between the sensor probe and the measured object at the upper position;

10) Calculate the position to which the sensor probe needs to move at the upper position; control the six-degree-of-freedom motion platform to move vertically to the above position through IPC, and the displacement of the movement is; if it is positive, it will move downward, if it is negative, it will move upward;

11) Control the rotation of the rotating hollow spindle through IPC to move the sensor probe to the left position;

12) Adjust the fine-tuning screw of the precision linear motion table so that the distance between the sensor head and the measured object is within the measuring range;

13) Control the rotation of the rotating hollow spindle through IPC to move the sensor probe to the right position;

14) Determine whether the distance between the sensor probe and the measured object is within the range of the sensor probe; if it is not within the range, repeat 4)-12); if it is within the range, proceed to the next step;

15) Adjust the fine-tuning screw of the precision linear motion table so that the distance between the sensor probe and the measured object is near the center of the measuring range; when performing alignment measurement, make sure that the distance between the sensor probe and the measured object is still within the sensor range;

16) Record the distance d 3 between the sensor probe and the measured object at the right position;

17) Control the rotation of the rotating hollow spindle through IPC to bring the sensor probe to the upper position;

18) Record the distance d 4 between the sensor probe and the measured object at the left position;

19) Calculate the position to which the sensor probe needs to move at the left position; control the six-degree-of-freedom motion platform to move horizontally to the above position through IPC, and the displacement of the motion is; if positive, move to the right; if negative, move to the left; at this point, centering Adjustment is over.

Furthermore, in the third step, the three-dimensional surface reconstruction process of the pipeline is:

Before performing three-dimensional surface reconstruction, calibrate the installation distance between the eddy current sensor probe and the laser displacement sensor probe;

a) Stick a small calibration metal piece on the surface of the pipe covering layer, and then, with the eddy current sensor probe and laser displacement sensor probe fixed, move the six-degree-of-freedom motion platform slowly along the pipe path through the IPC until The eddy current sensor probe is in contact with the calibration metal sheet; the pose coordinates of the six-degree-of-freedom motion platform are recorded, then returned to the initial position, and the spindle is rotated to rotate the laser displacement sensor probe to the position of the eddy current sensor probe; and then Use IPC to move the six-degree-of-freedom motion platform to the pose coordinates just recorded. Since the measurement distance of the laser displacement sensor probe is larger than that of the eddy current sensor probe, the measurement results obtained by the laser displacement sensor probe and the calibration metal sheet are: is the distance between the laser displacement sensor probe and the eddy current sensor probe;

b) Move the six-degree-of-freedom motion platform to the center of the range of the eddy current sensor probe and laser displacement sensor probe through IPC, then the thickness t of the covering layer is calculated as; Based on the above measurement principle;

c) Set the measurement precision and measurement parameters based on the maximum response frequency of the eddy current sensor probe and the laser displacement sensor probe and the diameter of the pipeline covering layer.

Furthermore, in the fourth step, the specific process of obtaining the characteristics of the metal core of the pipeline and the characteristics of the pipeline covering layer is as follows:

Based on the obtained three-dimensional data, calculate the characteristics of the pipeline core and covering layer; obtain the axial coordinates of the pipeline core and pipeline covering layer; calculate the axial coordinates of the pipeline covering layer;

The first step is to read the starting angle of sensor measurement. The angular interval corresponding to the height data points contained in each column vector is 0.9574°, and the polar coordinate amplitude corresponding to the height;

In the second step, based on the obtained cross-sectional profile data, the spiral point data of the three-dimensional space is obtained in each circular period. Based on the pose of the six-degree-of-freedom motion platform, the spatial angle of the cross-section is obtained, and the normal vector is projected to the vertical plane, that is, 3D contour point data on the same plane is obtained;

The third step is to use the contour data projected in the plane as the fitting data and perform circular curve fitting based on the least squares method to obtain the center of the circle.

Combined with the above technical solutions and the technical problems to be solved, please analyze the advantages and positive effects of the technical solutions to be protected by the present invention from the following aspects:

First, in view of the technical problems existing in the above-mentioned existing technologies and the difficulty of solving the problems, closely combine the technical solutions to be protected by the present invention and the results and data in the research and development process, etc., to conduct a detailed and profound analysis of how to solve the technical solutions of the present invention. Technical problems, and some creative technical effects brought about by solving the problems. The specific description is as follows:

The invention is suitable for on-machine three-dimensional surface profiling and feature extraction of (super) large-sized three-dimensional complex configuration composite material pipelines, and particularly relates to an on-machine three-dimensional profiling machining equipment for complex configuration composite material pipelines and methods. In the context of machining technology difficulties in the aerospace field, facing the need for efficient and high-precision machining of three-dimensional complex structure composite insulation pipelines with non-rotational body characteristics, it is necessary to first solve the problem of obtaining the three-dimensional characteristic structure of the pipeline. For three-dimensional complex configuration pipelines with metal cores and composite material covering layers, the present invention has significant beneficial effects, which mainly include: (1) On-machine measurement of complex three-dimensional configuration pipelines can be realized, eliminating the need for Secondary clamping error improves machining accuracy; (2) When the measurement accuracy requirements are not high, visual methods can be used to achieve rapid measurement and axis centering of complex three-dimensional configuration pipelines; when the measurement accuracy requirements are high Under high conditions, visual methods and non-contact sensor methods can be combined to achieve accurate measurement of complex three-dimensional configuration pipelines. Based on the on-machine measurement method, the axis center of the pipeline can be calculated and the machining route can be planned, providing necessary support for the adaptive machining of complex three-dimensional configuration pipelines; (3) Using a combination of multiple sensors, the inner surface of the pipeline metal can be measured The special fit of the core structure, the structural characteristics of the covering layer, the capture of the spatial position relationship between the two, and the three-dimensional surface reconstruction ensure the machining dimensional accuracy of the covering layer. The on-machine measurement device and application method involved in the present invention have obvious improvement effects for efficient and high-precision measurement and machining of three-dimensional complex structure composite material pipelines, and have a high degree of adaptability to three-dimensional complex structures, clear operating procedures, and simple methods. It is practical and conducive to quickly improving the measurement and machining capabilities of large and complex adiabatic pipelines in the aerospace field, thereby realizing application promotion.

Second, considering the technical solution as a whole or from a product perspective, the technical effects and advantages possessed by the technical solution to be protected by the present invention are specifically described as follows:

The present invention is oriented to the on-machine capture and machining requirements of composite pipe parts with complex three-dimensional configurations and relates to on-machine three-dimensional profiling machining equipment and methods for composite pipes with complex configurations. By converting three-dimensional complex pipelines into Structural insulated pipelines (small and medium-sized) are fixedly clamped at one end, or (medium-large) pipelines are fixed at both ends with a multi-point floating support in the middle section to reduce the deflection of medium-large pipelines due to their own weight. Curved deformation to ensure pipeline feature capture and machining accuracy requirements. The invention has obvious improvement effects in reducing human participation, improving the adaptability and efficiency of complex configuration pipeline measurement, guiding pipeline clamping, machining equipment centering and machining technology, etc. At the same time, it solves the problem of the spatial position relationship between the metal core and the composite material covering layer of the 3D complex structure pipeline and the problem that the three-dimensional characteristics cannot be quickly obtained. It has the advantages of high integration, simple operation, convenience and practicality, and is widely used in the aerospace field (super) has great promotion and application prospects in the measurement and machining of large and complex configuration composite pipelines.

Third, as auxiliary evidence of inventive step for the claims of the present invention, it is also reflected in the following important aspects:

The expected income and commercial value after the transformation of the technical solution of the present invention are:

The technical solution of the present invention is oriented to real applications in the aerospace field. It is a scientific research result produced during the research and development project and has practical application value.

(2) The technical solution of the present invention fills the technical gaps in the industry at home and abroad:

The technical solution of the present invention is oriented to real applications in the aerospace field and is a scientific research result produced during the research and development project. This technical solution is highly targeted and solves the technical problem of insulating pipelines with complex configurations in the aerospace field that cannot be measured on the machine during machining. It not only improves machining adaptability, but also effectively controls machining errors and provides active error compensation plan. In addition, features such as machining quality and machining defects can be quickly obtained through the three-dimensional profiling function, which provides clear guidance for the optimization of the machining technology.

BRIEF DESCRIPTION OF THE SEVERAL
VIEWS OF THE DRAWINGS

FIG. 19 is a flow chart of the application method of the on-machine three-dimensional profiling machining device for complex-configured composite material pipelines provided by the embodiment of the present invention;

In the figures: 1 on-machine measurement hollow machining structure; 1-1 direct drive motor wiring hole; 1-2 aviation plug mounting hole; 1-3 bearing lock; 1-4 lifting ring mounting hole; 1-5 hollow machining structure base; 1-6 balance support seat; 1-7 protective end cover; 1-8 hollow spindle; 1-9 magnetic grid sensor wiring hole; 1-10 conductive slip ring fixing hole; 1-11 conductive slip ring stator; 1-12 conductive slip ring mover; 1-13 direct drive motor stator; 1-14 direct drive motor mover; 1-15 first angular contact bearing; 1-16 second angular contact bearing; 1-17 magnetic scale; 1-18 magnetic grid reading head; 2 depth vision system; 2-1 two-dimensional pan-tilt; 2-2 rotation axis; 2-3 pitch axis; 2-4 camera lens; 2-5 heat dissipation system; 3 six-degrees-freedom motion platform; 3-1 hinge; 3-2 motion electric cylinder; 3-3 six-degrees-freedom motion platform base; 4 precision lifting rod; 5 linear motion module; 6 workpiece clamping column; 7 three-dimensional complex configuration composite material pipeline; 7-1 pipe metal inner core; 7-2 pipeline covering layer; 8 eddy current sensor probe; 8-1 installation bolts; 9 sensor premodule; 9-1 transmission cable; 10 precision linear motion table; 10-1 fine-tuning screw; 10-2 sensor probe bracket; 10-3 locking knob; 10-4 fixed base; 11 radial motion module; 11-1 linear guide rail; 11-2 stepper motor; 11-3 cutter; 12 laser displacement sensor probe; 13 calibration metal sheet; 14 rotation trajectory; 15 reciprocating rotation trajectory; 16 continuous rotation trajectory; 17-1 upper position; 17-2 right position; 17-3 lower position; 17-4, left position.

See the red section for details. The calibration metal piece is only used during calibration and must be removed after calibration. The rotation trajectory refers to the rotation trajectory of the sensor, because according to the clamping method in FIG. 1, the pipeline is fixed. Rotation trajectory 14 has been marked in FIG. 10. The reciprocating rotation trajectory 15 has been marked in FIG. 11. The up, down, left, and right positions are relative to the pipeline. Looking along the pipeline toward the measuring equipment and sensors, the relative positions are marked in FIG. 10.

DETAILED DESCRIPTION

In order to make the purpose, technical solutions and advantages of the present invention clearer, the present invention will be furthermore described in detail below in conjunction with examples. It should be understood that the specific embodiments described here are only used to explain the present invention and are not intended to limit the present invention.

1. Explain the embodiment. In order to enable those skilled in the art to fully understand how the present invention is specifically implemented, this section is an illustrative example that expands and explains the technical solutions of the claims.

Figure 1:
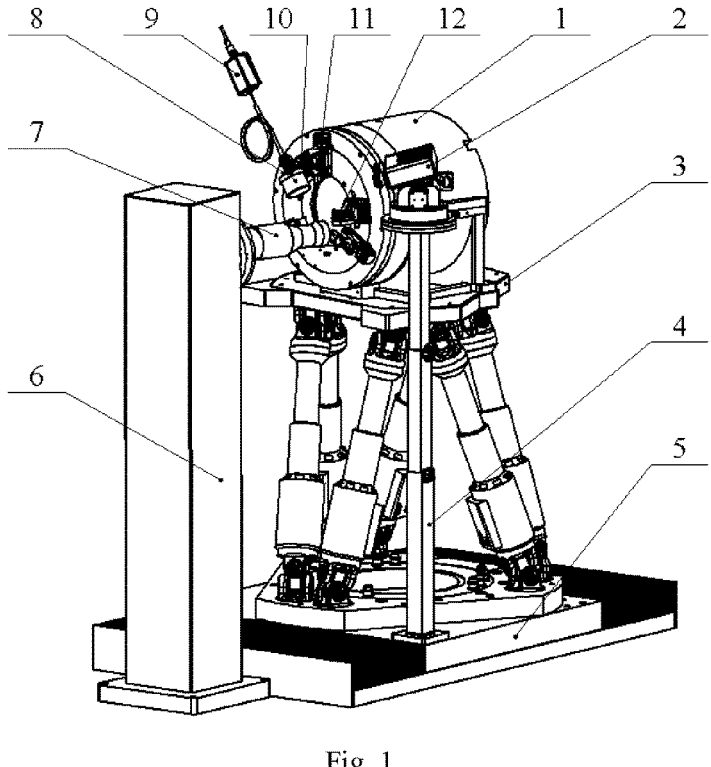
FIG. 1 is a schematic structural diagram of an on-machine three-dimensional profiling machining device for complex-configured composite material pipelines provided by an embodiment of the present invention.
Figure 2:
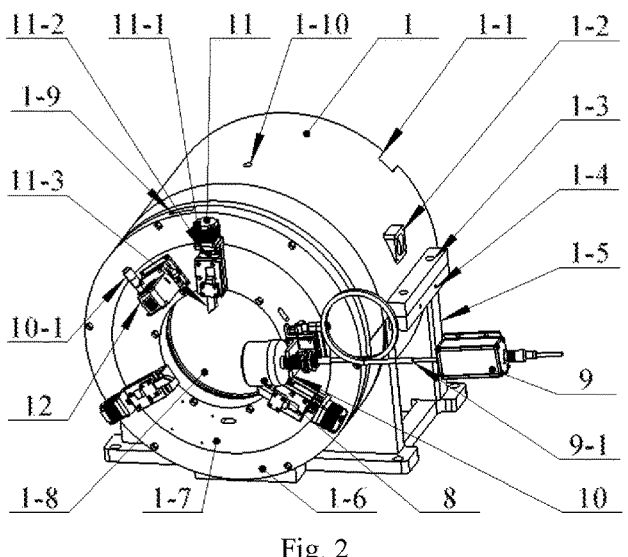
FIG. 2 is a schematic diagram of the overall structure of a hollow on-machine measuring and machining device provided by an embodiment of the present invention.
Figure 3:
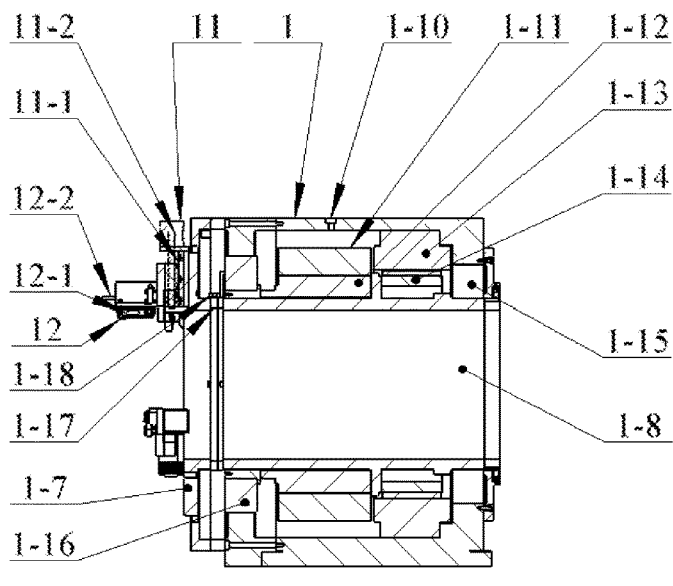
FIG. 3 is a side cross-sectional view of a hollow on-machine measuring and machining device provided by an embodiment of the present invention.
Figure 4:
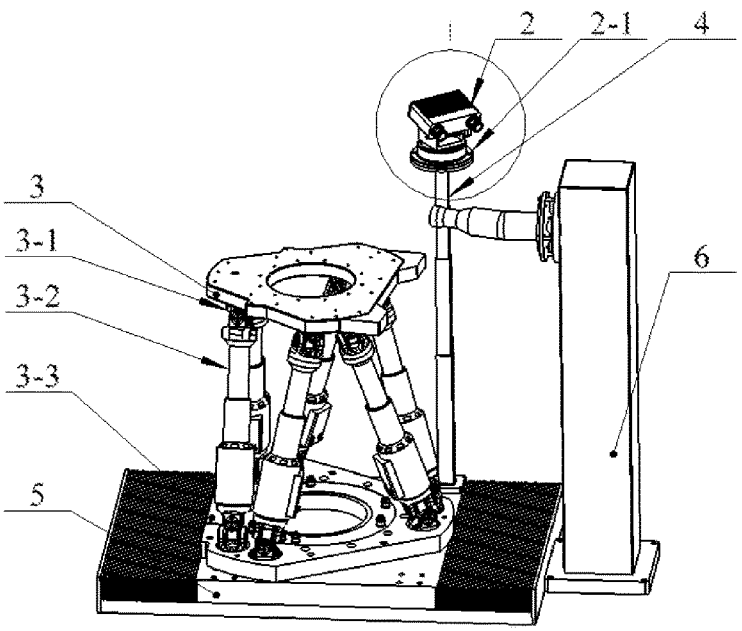
FIG. 4 is a schematic structural diagram of a six-degree-of-freedom motion platform, a linear motion module, and a depth vision system provided by an embodiment of the present invention.
Figure 5:
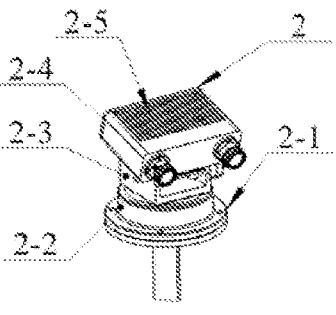
FIG. 5 is an enlarged schematic diagram of the depth vision system provided by an embodiment of the present invention.
Figure 6:
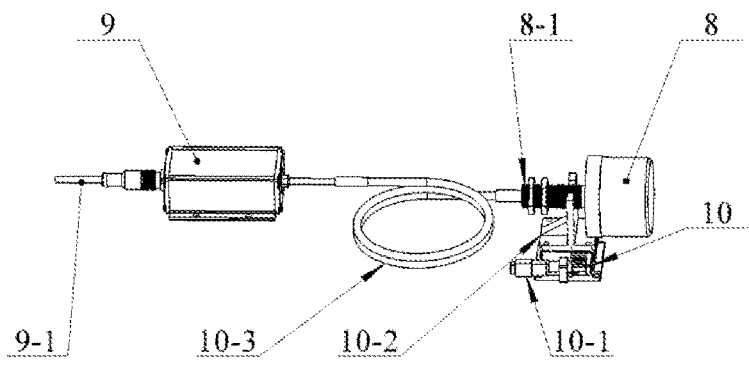
FIG. 6 is a schematic structural diagram of an eddy current sensing system provided by an embodiment of the present invention.
Figure 7:
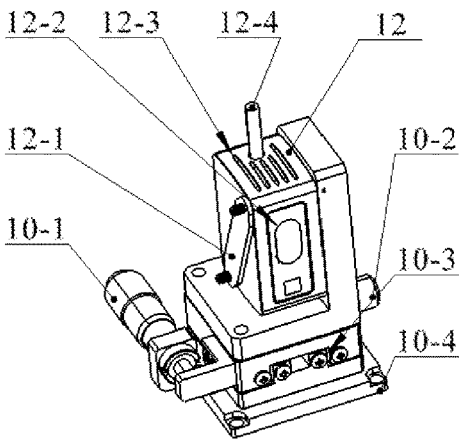
FIG. 7 is a schematic structural diagram of a laser displacement sensing system provided by an embodiment of the present invention.
Figure 8:
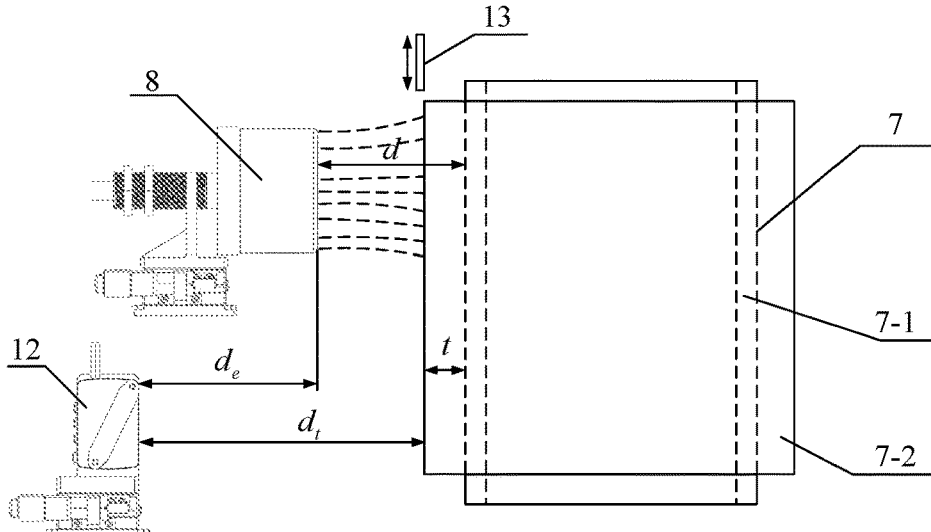
FIG. 8 is a schematic diagram of the position calibration of the eddy current sensor probe and the laser displacement sensor probe provided by the embodiment of the present invention.

As shown in FIG. 1, the on-machine three-dimensional profiling machining device for complex-configured composite pipes provided by the embodiment of the present invention is provided with a linear motion module 5 (i.e., linear motion mover module). The linear motion module 5 is equipped with a precision lifting rod 4. The precision lifting rod 4 is installed on the linear motion module 5. A depth vision system 2 is installed on the lifting rod 4; a six-degree-of-freedom motion platform 3 is installed on the upper end of the linear motion module 5, an on-machine measurement hollow machining structure (i.e., a hollow machining and measurement structure) 1 is installed on the upper end of the six-degree-of-freedom motion platform 3, and the front end of the linear motion module 5 is installed There is a workpiece clamping column 6, and a three-dimensional complex configuration composite material pipeline 7 is installed at the end of the workpiece clamping column 6; a precision linear motion table 10 and a radial motion mold are installed on the rotating cutterhead of the machine measuring hollow machining structure 1 Group 11, two precision linear motions are equipped with eddy current sensor and a laser displacement sensor probe respectively. The precision linear motion table is equipped with eddy current sensor probe 8 through mounting bolts 8-1, and eddy current sensor probe 8 is installed through the transmission The cable 9-1 is connected to the sensor premodule 9. The six-degree-of-freedom motion platform 3 is installed on the linear motion module 5, and the two are controlled through the motion control card, which can realize linear motion and spatial multi-degree-of-freedom linkage. The linear motion module

5 is also equipped with a precision lifting rod 4. A two-dimensional pan-tilt 2-1 is installed on the precision lifting rod 4. When measuring through images, use the precision lifting rod 4 and the two-dimensional pan-tilt 2-1 to perform preliminary pipeline feature extraction; when using the on-machine measurement hollow machining structure 1 for measurement and three-dimensional profiling, lower the precision lifting rod to the bottom of the six-degree-of-freedom motion platform 3 to prevent interference with the moving six-degree-of-freedom motion platform 3. By controlling the linkage of the six-degree-of-freedom motion platform 3 and the linear motion module 5, the present invention achieves on-machine measurement of the axial trajectory of a pair of composite material pipelines in a hollow machining structure, thereby achieving high precision of complex three-dimensional configuration pipelines. Precision and efficient machining.

On-machine measurement hollow machining structure 1 includes: direct drive motor wiring hole 1-1, aviation plug mounting hole 1-2, bearing lock 1-3, lifting ring mounting hole 1-4, hollow machining structure base 1-5, balance support seat 1-6, protective end cover 1-7, hollow spindle 1-8, magnetic grid sensor wiring hole 1-9, conductive slip ring fixing hole 1-10, conductive slip ring stator 1-11, conductive slip ring moving Sub 1-12, direct drive motor stator 1-13, direct drive motor rotor 1-14, first angular contact bearing 1-15, second angular contact bearing 1-16, magnetic scale 1-17, magnetic scale reading head 1-18. On-machine measurement The front end of the hollow machining structure 1 is installed with a balance support seat 1-6 through bolts, which is used to carry the balance of the whole machine. The balance support seat 1-6 is fixed with a protective end cover 1-7 through bolts; the balance support seat 1-6 A magnetic grid sensor wiring hole 1-9 is provided on the machine. A hollow spindle 1-8 is installed inside the machine measuring hollow machining structure 1 through a first angular contact bearing 1-15 and a second angular contact bearing 1-16. The contact bearing 1-15 and the second angular contact bearing 1-16 are clamped by the bearing lock 1-3. The bearing lock 1-3 is provided with a lifting ring mounting hole 1-4; the hollow machining structure 1 of the machine measurement is provided with a straight The drive motor wiring hole 1-1, the aviation plug installation hole 1-2 and the conductive slip ring fixing hole 1-10. The conductive slip ring fixing hole 1-10 is used to fix the conductive slip ring stator 1-11; on-machine measurement and hollow machining The lower end of structure 1 is provided with a hollow machining structure base 1-5, and conductive slip ring stators 1-11 are installed on the hollow main shaft 1-8 through screws. The conductive slip ring stators 1-11 are distributed in three positions with a phase difference of 120°. The conductive slip ring stator 1-11 is fixed through three conductive slip ring fixing holes 1-10 distributed along the axial direction, and the cables drawn therefrom are led out to the stepper motor driver through the aviation plug mounting holes 1-2. The first angular contact bearing 1-15 and the second angular contact bearing 1-16 support the hollow spindle 1-8. The angular contact bearing has good radial, axial and combined load-bearing capacity and can meet the needs of high-speed operation. The selected installation method is back-to-back, with no distinction between fixed end and free end.

On-machine measurement hollow machining structure 1 is provided with a conductive slip ring stator 1-11, a conductive slip ring mover 1-12, a direct drive motor stator 1-13, and a direct drive motor mover 1-14. On-machine measurement hollow machining structure 1A magnetic scale 1-17 and a magnetic grid reading head 1-18 are installed on the left end. Three radial motion modules 11 are installed on the protective end cover 1-7. The radial motion module 11 is equipped with a linear guide 11-1, a stepper motor 11-2, and a cutter 11-3. The cutter 11-3 is installed on The lower end of the radial motion module 11. The radial motion module 11 is driven by a ball screw, and the cutter 11-3 is used to realize radial deep machining of the outer circle of composite material pipelines, adapt to the continuous machining of variable diameter pipelines, and ensure rapid prototyping of pipelines.

The hollow spindle 1-8 is driven to rotate by the direct drive motor stator 1-13 and the direct drive motor rotor 1-14. The cables of the direct drive motor stator 1-13 and the direct drive motor rotor 1-14 are routed through the direct drive motor. Hole 1-1 is connected to the driver, and forms a closed-loop motion system with the magnetic scale 1-17 and the magnetic grid reading head 1-18. The magnetic grid reading head 1-18 is connected to the driver through the magnetic grid sensor wiring hole 1-9. The lifting ring mounting holes 1-4 are used to install lifting rings to facilitate the transportation and assembly of the entire device; the hollow machining structure base 1-5 is used to fix the overall device, and the balance support seat 1-6 is used to support the front end of the entire device. The stepper motor 11-2 leads out the A± and B± phase lines, and communicates with the stepper motor driver through the conductive slip ring stator 1-11 and the conductive slip ring mover 1-12. The conductive slip ring fixing hole 1-10 and the conductive slip ring stator 1-11 can realize that the conductive slip ring mover 1-12 rotates together with the hollow main shaft 1-8, and the conductive slip ring stator 1-11 is the fixed end, and leads from it Cables. The radial movement of the radial movement module 11 drives the movement of the cutter 13 to achieve adaptive machining of the variable diameter pipeline. In addition, the eddy current sensor probe 8 and the laser displacement sensor probe 12 will also rotate with the hollow spindle 1-8 during actual measurement. The power supply and communication of the sensor also need to be transmitted through wired methods, so the cables will be tangled. question. The cables that complete this function are also implemented through the conductive slip ring stator 1-11 and the conductive slip ring mover 1-12. Through the circuit switch, rapid switching between on-machine measurement and tool radial feed motion is achieved.

The depth vision system 2 includes a two-dimensional pan-tilt 2-1, a rotation axis 2-2, a tilt axis 2-3, a camera lens 2-4 and a heat dissipation system 2-5; the two-dimensional pan-tilt 2-1 is equipped with a rotation axis 2-2, a pitch axis 2-3 is installed on the rotation axis 2-2, a camera lens 2-4 is installed on the pitch axis 2-3, and a heat dissipation system (i.e., heat dissipator) 2-5 is provided on the camera lens 2-4.

The camera lens 2-4 and the heat dissipation system 2-5 form part of the vision camera, which is installed on the two-dimensional pan-tilt 2-1. The two-dimensional pan-tilt 2-1 contains two degrees of freedom, which are controlled by the rotation axis 2-2 and the pitch axis 2-3 respectively, allowing the depth vision camera to perform rotation and pitch movements to ensure the detection of complex configurations of composite pipelines. Comprehensive and accurate image acquisition.

The six-degree-of-freedom motion platform 3 includes a hinge 3-1, a motion electric cylinder 3-2, and a six-degree-of-freedom motion platform base 3-3; a motion electric cylinder 3-2 is installed on the upper end of the six-degree-of-freedom motion platform base 3-3. The cylinder 3-2 is mounted with a platform via a hinge 3-1. The base 3-3 of the six-degree-of-freedom motion platform is provided with an electrical interface. There are 6 motion electric cylinders 3-2 and 6 degrees of freedom motion platform bases 3-3 respectively.

The three-dimensional complex configuration composite pipeline 7 includes a pipeline metal core 7-1 and a pipeline covering layer 7-2; the outside of the pipeline metal core 7-1 is wrapped with a pipeline covering layer 7-2.

The precision linear motion table 10 includes a fine-tuning screw 10-1, a sensor probe bracket 10-2, a locking knob 10-3, and a fixed base 10-4; the sensor probe bracket 10-2 is installed on the precision linear motion table 10, and the sensor The probe bracket 10-2 has an eddy current sensor probe 8; the sensor probe bracket 10-2 is connected to the fixed base 10-4 through a locking knob 10-3, and the sensor probe bracket 10-2 is equipped with a fine-tuning screw 10-1. The precision linear motion table 10 is also provided with a fixed base 10-4, which is installed on the hollow spindle 1-8 and rotates with the rotation of the hollow spindle. The installation methods of the laser displacement sensor probe 12 and the eddy current sensor probe 8 are the same, and only the structure of the sensor probe bracket 10-2 is different. The installation angle between the laser displacement sensor probe 12 and the eddy current sensor probe 8 differs by 120° along the outer circumference of the hollow spindle 1-8.

As shown in FIG. 19, the application method of the on-machine three-dimensional profiling machining device for complex-configured composite material pipelines provided by the embodiment of the present invention includes:

S101: After all sensor systems and probes have been installed, start the measurement process; move the six-degree-of-freedom motion platform to the other side of the depth vision system, and upgrade the depth vision system to a complete configuration that can collect pipelines The position of the feature is moved by moving the linear motion module to achieve three-dimensional data acquisition by the depth vision system at different relative positions in the pipeline.

S102: Through the calculation of the depth vision system, obtain the three-dimensional configuration characteristic information of the pipeline, and calculate the axis position and change characteristics of the pipeline. Based on this, the measurements of each motion mechanism during the three-dimensional surface reconstruction of the pipeline are obtained Posture trajectory.

S103: Before performing the actual three-dimensional surface reconstruction of the pipeline, perform a centering operation based on one end of the pipeline. The centering operation process refers to the pipeline end centering process; after completing the centering operation, start the first three-dimensional alignment of the pipeline. The surface is reconstructed. For details, refer to the three-dimensional surface reconstruction process of the pipeline.

S104: Based on the reconstructed three-dimensional surface data, calculate the pipeline axis characteristics and the spatial characteristics along the motion direction of the linear motion module; based on the obtained pipeline axis characteristics, repeat the accurate pipeline three-dimensional surface reconstruction process; based on The obtained precise three-dimensional surface reconstruction characteristics of the pipeline are obtained from the laser displacement sensor probe and the eddy current sensor probe respectively, and the characteristics of the metal core of the pipeline and the characteristics of the pipeline covering layer are calculated.

S105: Based on the obtained characteristics of the pipeline metal core and the pipeline covering layer, the spatial position relationship between the pipeline metal core and the pipeline covering layer is calculated; calculated based on the changes in the axis of the three-dimensional complex configuration composite pipeline According to the precise posture trajectory and machining technology requirements, the machining of the pipeline covering layer begins.

Figure 10:
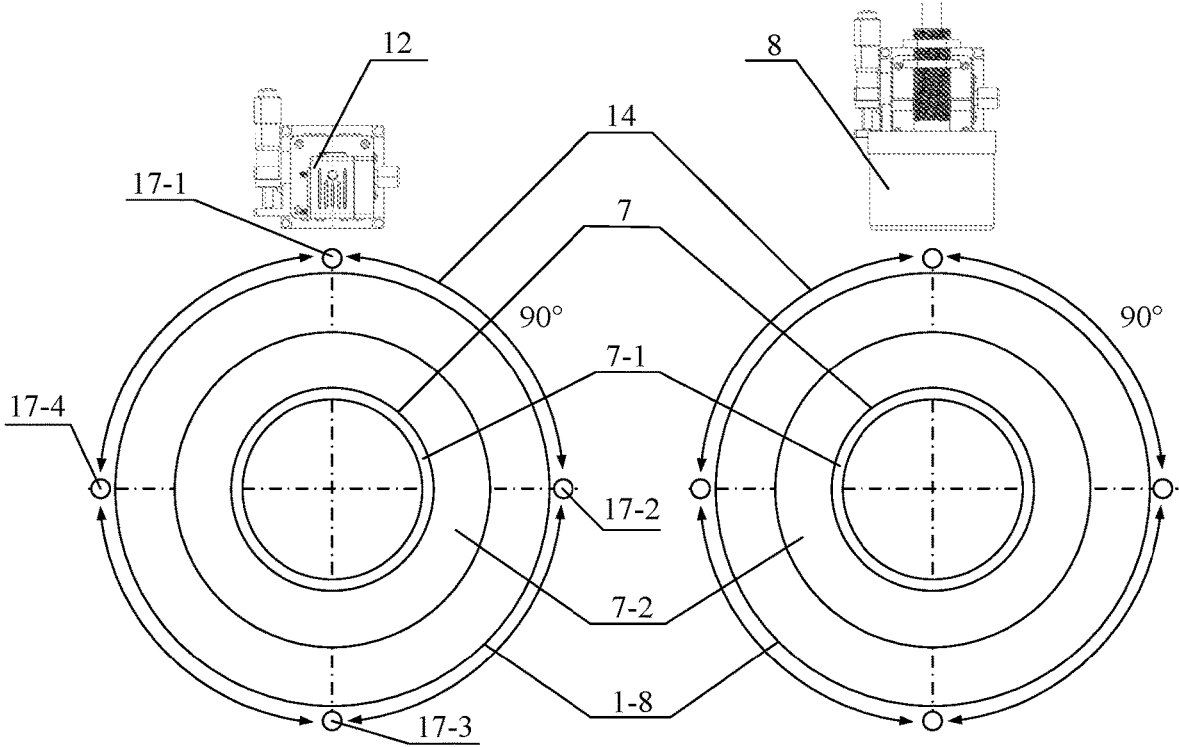
FIG. 10 is a schematic diagram of alignment facing the pipeline covering layer or inner core provided by the embodiment of the present invention.
Figure 13:
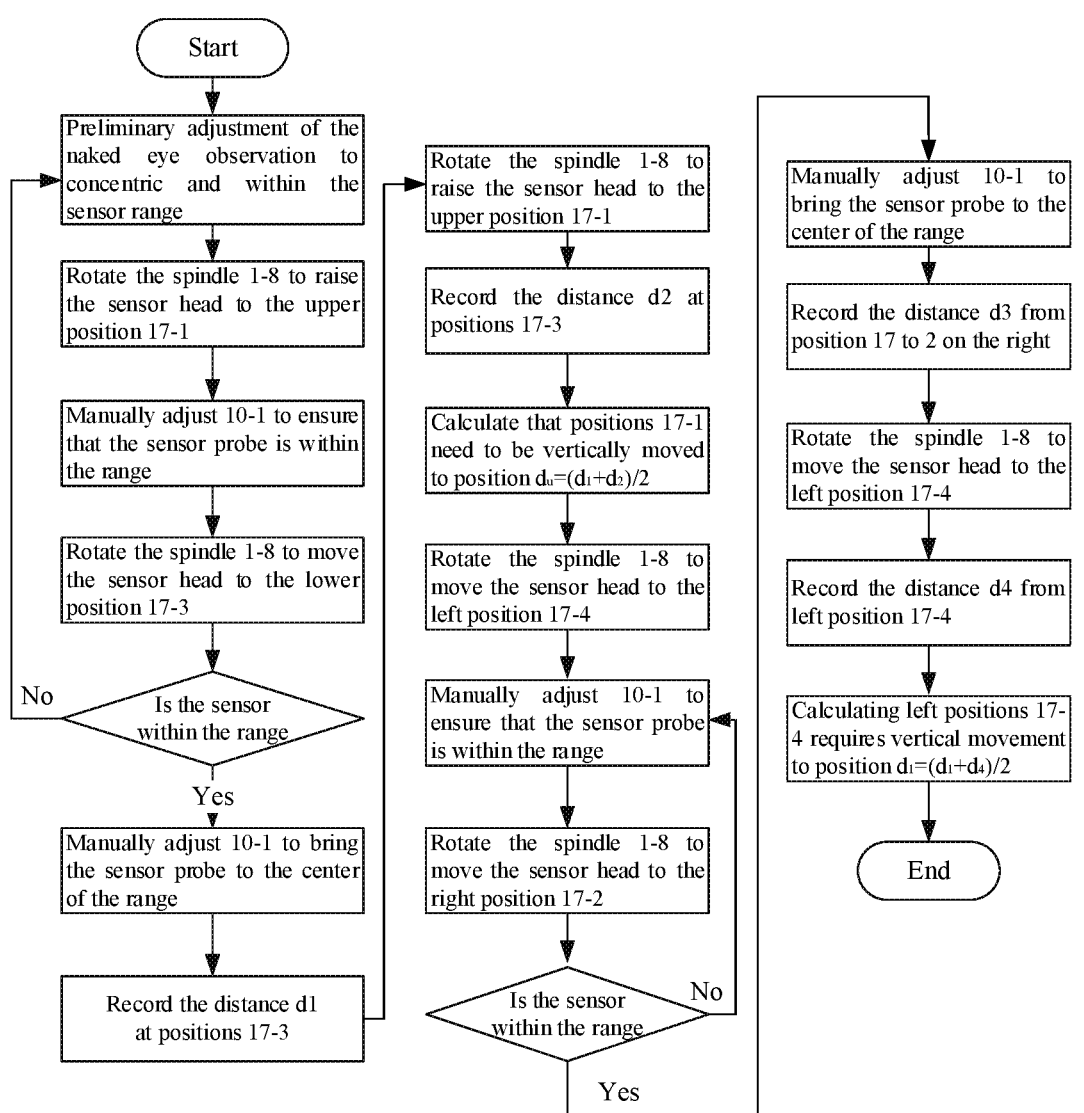
FIG. 13 is a schematic diagram of the pipeline end centering process provided by the embodiment of the present invention.
Figure 14:
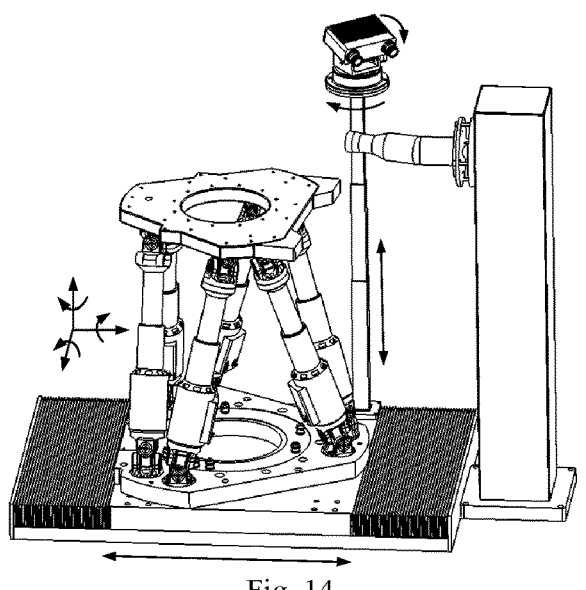
FIG. 14 is a schematic diagram of the freedom of movement of the overall equipment provided by the embodiment of the present invention.
Figure 15:
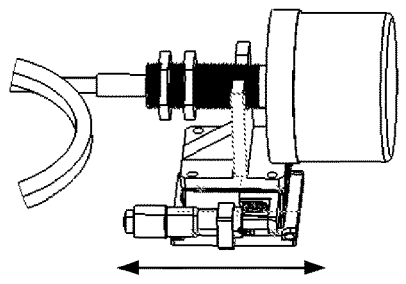
FIG. 15 is a schematic diagram of the degree of freedom of movement of the sensor probe provided by the embodiment of the present invention.

As shown in FIGS. 10 and 13, in S103 provided by the embodiment of the present invention, the specific process of the pipeline end centering process is:

When centering is performed through the end of the pipeline covering, the sensor probe is a laser displacement sensor probe; when centering is performed through the end of the metal core of the pipeline, the sensor probe is an eddy current sensor probe;

1) Through naked eye observation, adjust the six-degree-of-freedom motion platform to the approximate center position between the hollow main shaft of the device and the end of the pipeline;

2) Control the rotation of the rotating hollow spindle through IPC to bring the sensor probe to the upper position;

3) Manually adjust the fine-tuning screw of the precision linear motion table so that the distance between the sensor head and the measured object is within the measuring range;

4) Control the rotation of the rotating hollow spindle through IPC to move the sensor probe to the lower position;

5) Determine whether the distance between the sensor probe and the measured object is within the range of the sensor probe; if it is not within the range, repeat 3); the precision linear motion table has a limited stroke, and if the conditions still cannot be met, Then repeat 3); when it is within the measurement range, proceed to the next step;

6) Manually adjust the fine-tuning screw of the precision linear motion table so that the distance between the sensor probe and the measured object is near the center of the measuring range; this can keep the distance between the sensor probe and the measured object as close as possible when performing alignment measurements. Within the sensor range;

7) When the above conditions are met, start recording the distance $d_1$ between the sensor probe and the measured object at the position;

8) Control the rotation of the rotating hollow spindle through IPC to bring the sensor probe to the upper position;

9) Record the distance $d_2$ between the sensor probe and the measured object at the upper position;

10) Calculate the position to which the sensor probe needs to move at the upper position $d_u=(d_1+d_2)/2$; control the six-degree-of-freedom motion platform to move vertically to the above position $d_2-d_u$ through IPC, and the displacement of the movement is; if it is positive, it will move downward, if it is negative, it will move upward;

11) Control the rotation of the rotating hollow spindle through IPC to move the sensor probe to the left position;

12) Manually adjust the fine-tuning screw of the precision linear motion table so that the distance between the sensor head and the measured object is within its range;

13) Control the rotation of the rotating hollow spindle through IPC to move the sensor probe to the right position;

14) Determine whether the distance between the sensor probe and the measured object is within the range of the sensor probe; if it is not within the range, repeat 4)-12); if it is within the range, proceed to the next step;

15) Manually adjust the fine-tuning screw of the precision linear motion table so that the distance between the sensor probe and the measured object is near the center of its range; this can keep the distance between the sensor probe and the measured object as close as possible during alignment measurement. Within the sensor range;

16) Record the distance $d_3$ between the sensor probe and the measured object at the right position;

17) Control the rotation of the rotating hollow spindle through IPC to bring the sensor probe to the upper position;

18) Record the distance $d_4$ between the sensor probe and the measured object at the left position;

19) Calculate the position to which the sensor probe needs to move at the left position $d_1=(d_3+d_4)/2$; control the six-degree-of-freedom motion platform to move horizontally to the above position through IPC, and the displacement of the motion is $d_4-d_1$; if positive, move to the right; if negative, move to the left; at this point, centering The adjustment operation is completed.

Figure 9:
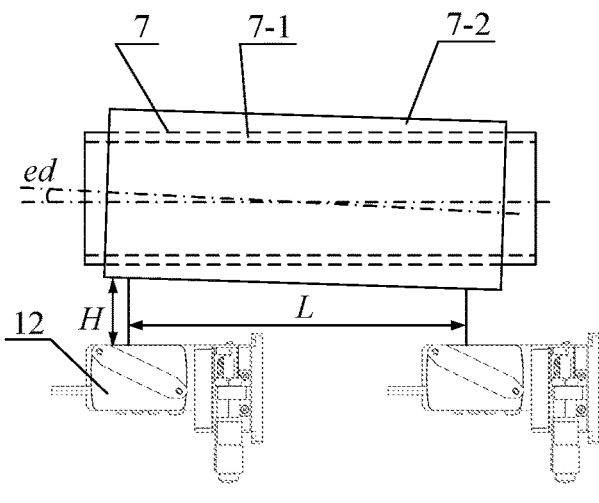
FIG. 9 is a schematic diagram of measuring the outline axis of the pipeline covering layer for a simple configuration provided by the embodiment of the present invention.

For a straight pipeline with only a variable diameter structure, considering its installation error, there is an angle between the pipeline axis and the movement direction of the linear motion module 5. You can choose to only use the eddy current sensor probe 8 or the laser displacement sensor probe 12 to measure the profile of the metal core or covering layer of the pipeline along the axis of the pipeline. Take the measurement of the profile of the covering layer as an example, as shown in FIG. 9 Show. The distance L is measured along the axis of the pipeline, and the distance can be expressed as $H=(H_1, H_2 \ldots, H_i)$. The least squares method is used to linearly fit H, and the deflection angle is calculated by fitting the slope and the angular displacement of the laser displacement sensor. Through the laser displacement sensor probe 12 and the eddy current sensor probe 8, the metal core axis and the covering layer axis can be measured respectively, and the angular deviation ed between the two can be calculated through linear fitting.

S103 provided by the embodiment of the present invention, the three-dimensional surface reconstruction process of the pipeline is:

Before performing three-dimensional surface reconstruction, the installation distance between the eddy current sensor probe and the laser displacement sensor probe needs to be calibrated;

a) Stick a calibration metal piece 13 on the surface of the pipeline covering layer 7-2, and then move the six-degree-of-freedom motion platform slowly along the pipe path through the IPC when the eddy current sensor probe and laser displacement sensor probe are fixed, until the eddy current sensor probe is in contact with the calibration metal sheet (the voltage signal of the eddy current sensor probe is 0V). At this time, record the pose coordinates of the six-degree-of-freedom motion platform, then return to the initial position, and rotate the spindle (the rotation angle is 60°) to rotate the laser displacement sensor probe to the position of the eddy current sensor probe; then move it through IPC From the six-degree-of-freedom motion platform to the pose coordinates just recorded, since the measurement distance of the laser displacement sensor probe is larger than that of the eddy current sensor probe, the measurement result obtained by the laser displacement sensor probe and the calibration metal piece is the laser displacement. The distance between $d_e$ the sensor probe and the eddy current sensor probe;

b) Move the six-degree-of-freedom motion platform through IPC to the center of the range of the eddy current sensor probe and laser displacement sensor probe (there is a certain distance between the eddy current sensor probe and the surface of the covering layer to ensure that there is no interference during the measurement process), then The thickness t of the covering layer can be calculated as: $t=d_e+d_r$. Based on the above measurement principles, the three-dimensional surface reconstruction method of the pipeline, as shown in FIG. 11, can continue to proceed with the following steps.

c) Set the measurement precision and measurement parameters based on the maximum response frequency of the eddy current sensor probe and laser displacement sensor probe, such as 1 kHz, and the diameter of the pipeline covering layer.

Taking the diameter of the pipeline covering layer as 60 mm as an example: the point interval of the pipeline cross-section profile is set to 500 μm, and the profile length of the pipeline cross-section is 60π mm. A total of about 377 points need to be measured. Combined with the Nyquist sampling theorem and To avoid signal aliasing, the actual sampling frequency of the available sensors is approximately 390.6 Hz. Then the time required to collect a cross-sectional profile is about 377/390.6=0.966s, then the spindle speed can be set to: 62 rpm; the interval between pipeline sections is set to 500 μm, and the length of the pipeline to be measured is 200 mm, then the moving speed of the linear motion module 5 can be set to: 0.51 mm/s. The time required to measure the entire pipeline is approximately 6.54 minutes.

Figure 11:
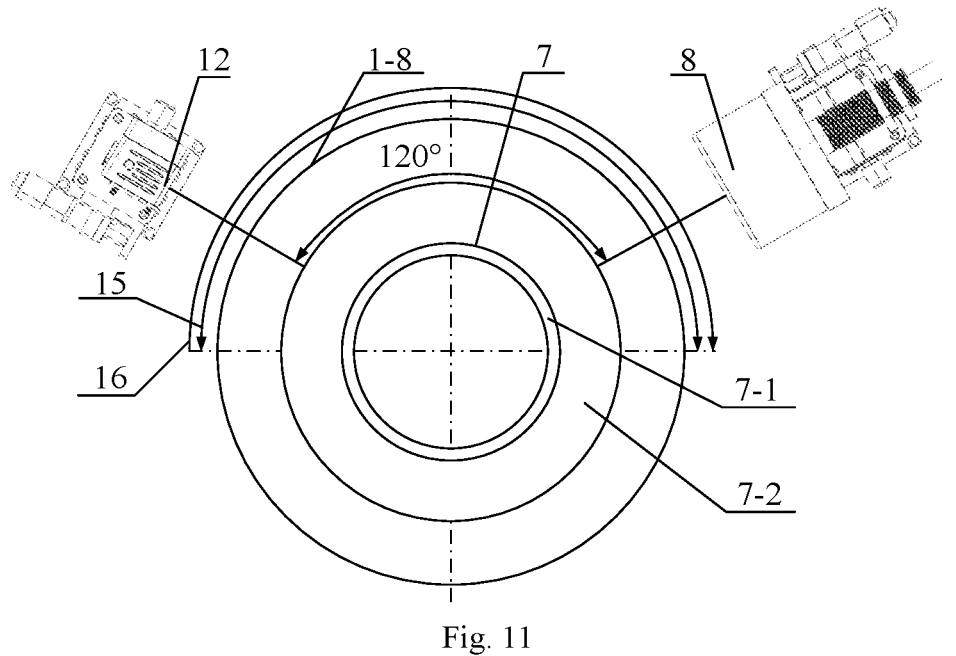
FIG. 11 is a schematic diagram of three-dimensional surface reconstruction of pipelines provided by an embodiment of the present invention.

There are two methods for measuring the actual cross-sectional profile, as shown in FIG. 11: In the first method, the rotating hollow spindle uses a rotation method to measure the cross-sectional profile, and reversely rotates when it is about to rotate 360°; the second method In this method, the rotating hollow spindle adopts the rotating port type in the process to rotate and measure the cross-sectional profile, that is, it continuously rotates in the clockwise or counterclockwise direction. In view of the problem of acceleration and deceleration when the rotating hollow spindle changes direction during rotation, it is easy to cause a mismatch with the sensor measurement frequency, thereby introducing measurement errors. Therefore, it is generally recommended to use the second measurement method. The profile data obtained by the second method during continuous measurement is reflected in the form of a spiral. The three-dimensional data lattice of the inner core surface of the pipeline obtained based on this method can be expressed as:

$$[d_1 \quad d_2 \quad \ldots \quad d_n] = \begin{bmatrix} d_{11} & d_{21} & \ldots & d_{n1} \\ d_{12} & d_{22} & \ldots & d_{n2} \\ \vdots & \vdots & \ddots & \vdots \\ d_{n1} & d_{n2} & \ldots & d_{nn} \end{bmatrix};$$

Among them $d_1, \ldots, d_n$ represents the profile column vectors from $d_{11} \ldots d_{nn}$ 1 to n sections obtained by the eddy current sensor probe. Represents the silhouette height data contained in the column vector. Then the three-dimensional data lattice on the surface of the pipeline covering layer can be expressed as:

$$[d_{t1} \quad d_{t2} \quad \ldots \quad d_{tm}] = \begin{bmatrix} d_{t11} & d_{t21} & \ldots & d_{tm1} \\ d_{t12} & d_{t22} & \ldots & d_{tm2} \\ \vdots & \vdots & \ddots & \vdots \\ d_{tm1} & d_{tm2} & \ldots & d_{tmn} \end{bmatrix};$$

Among them $d_{t1}, \ldots, d_{tm}$ represents the profile column vector from $d_{t11}, \ldots, d_{tmn}$ 1 to n sections obtained by the laser displacement sensor probe, and represents the profile height data contained in the column vector.

Figure 16:
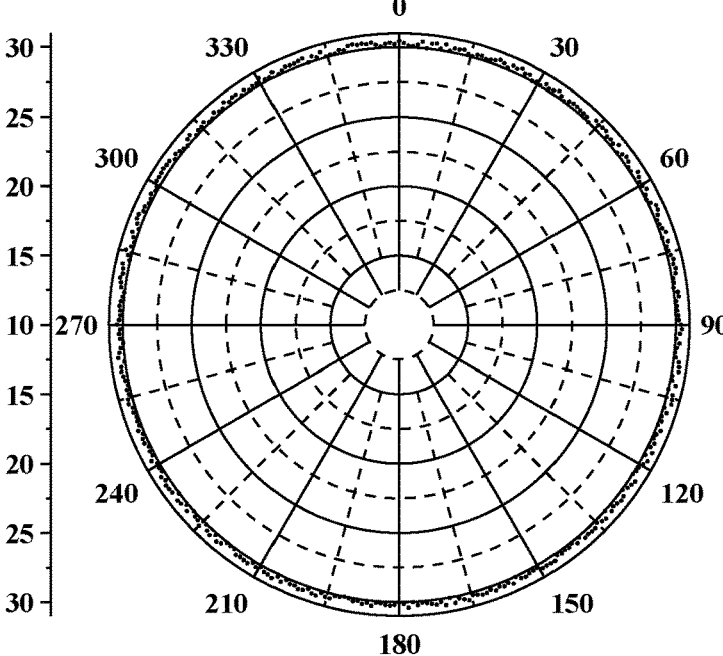
FIG. 16 is a schematic diagram of the polar coordinate projection measurement results of the pipeline cross-sectional profile provided by the embodiment of the present invention.

S104 provided by the embodiment of the present invention, in the pipeline feature extraction, based on the three-dimensional data obtained by the second measurement method, the specific process of determining the pipeline metal core characteristics and pipeline covering layer characteristics is as follows:

Based on the obtained three-dimensional data, calculate the characteristics of the pipeline core and covering layer; obtain the axial coordinates of the pipeline core and pipeline covering layer; take the calculation of the axial coordinates of the pipeline covering layer as an example:

The first step is to read the sensor measurement starting angle (the angle corresponding to the hollow main axis). The angle interval corresponding to the height data points contained in each column vector is 0.9574°, and the polar coordinate amplitude corresponding to the height. Then the measurement results in polar coordinates can be calculated directly, and the results are shown in FIG. 16.

In the second step, based on the obtained cross-sectional profile data, the spiral point data of the three-dimensional space is obtained in each circular period. According to the posture of the six-degree-of-freedom motion platform, the spatial angle of the cross-section can be obtained, and this is used as a normal vector to By projecting on a vertical plane, 3D contour point data on the same plane can be obtained.

The third step is to use the contour data projected in the plane as the fitting data, and perform circular curve fitting based on the least squares method to obtain the center of the circle. The circle fitting principle is as follows:

The fitting circle of the least squares method can be expressed as:

$$R^2=(x-A)^2+(y-B)^2;$$

Order $a=-2A$, $b=-2B$, $c=A^2+B^2-R^2$. The above formula can be transformed into:

$$x^2+y^2+ax+by+c=0.$$

Then after finding the parameters a, b, c, you can get the parameters of the circle center radius:

$$\begin{cases} A = -\dfrac{a}{2} \\ B = -\dfrac{b}{2} \\ R = \dfrac{\sqrt{a^2 + b^2 - 4c}}{2} \end{cases};$$

Point data set $(X_i, Y_i)$, $i \in (1, 2, 3, \ldots, N)$ the distance from the midpoint to the center of the circle is $d_i$:

$$d_i^2 = (X_i - A)^2 + (Y_i - B)^2;$$

The difference between the square of the distance from the point to the circle outline and the square of the radius is: $(X_i, Y_i)$ $$\delta_i = d_i^2 - R^2 = (X_i - A)^2 + (Y_i - B)^2 - R^2 = X_i^2 + Y_i^2 + aX_i + bY_i + c;$$

Let the sum of squares of Q(a, b, c)be $\delta_i$:

$$Q(a, b, c) = \sum \delta_i^2 = \sum \left[ \left( X_i^2 + Y_i^2 + aX_i + bY_i + c \right) \right]^2;$$

Find the parameters a, b, c to Q(a, b, c) minimize the value. Taking the extreme value of this, we get:

$$\begin{bmatrix} \dfrac{\partial Q}{\partial a} \\ \dfrac{\partial Q}{\partial b} \\ \dfrac{\partial Q}{\partial c} \end{bmatrix} = \begin{bmatrix} \sum 2\left(X_i^2 + Y_i^2 + aX_i + bY_i + c\right)X_i \\ \sum 2\left(X_i^2 + Y_i^2 + aX_i + bY_i + c\right)Y_i \\ \sum 2\left(X_i^2 + Y_i^2 + aX_i + bY_i + c\right) \end{bmatrix} = 0;$$

Solving the equation gives:

$$\begin{bmatrix} a \\ b \\ c \end{bmatrix} = \begin{bmatrix} \dfrac{HD - EG}{CG - D^2} \\ \dfrac{HC - ED}{D^2 - GC} \\ \dfrac{\sum \left(X_i^2 + Y_i^2\right) + a\sum X_i + b\sum Y_i}{N} \end{bmatrix};$$

Among them, the capital letters are:

$$\begin{bmatrix} C \\ D \\ E \\ G \\ H \end{bmatrix} = \begin{bmatrix} N\sum X_i^2 - \left(\sum X_i\right)^2 \\ N\sum X_i Y_i - \sum X_i \sum Y_i \\ N\sum X_i^3 + N\sum X_i Y_i^2 - \sum \left(X_i^2 + Y_i^2\right)\sum X_i \\ N\sum Y_i^2 - \left(\sum Y_i\right)^2 \\ N\sum X_i^2 Y_i + N\sum Y_i^3 - \sum \left(X_i^3 + Y_i^3\right)\sum Y_i \end{bmatrix};$$

According to the formula $$\begin{cases} A = -\dfrac{a}{2} \\ B = -\dfrac{b}{2} \\ R = \dfrac{\sqrt{a^2 + b^2 - 4c}}{2} \end{cases},$$

the parameters of the fitted circle can be obtained.

In the actual three-dimensional surface reconstruction of pipelines, the data obtained based on the second measurement method are only polar coordinates and do not reflect the actual spatial coordinate information. Therefore, in the process of reconstructing the three-dimensional surface, it is also necessary to perform coordinate transformation or describe the height data of the pipeline surface in a Cartesian coordinate system. The three-dimensional reconstruction method of the pipeline surface is divided into the following two parts:

The measured three-dimensional height and position information of the pipeline space is depicted in the Cartesian coordinate system, based on the formula:

$$\begin{bmatrix} X \\ Z \\ Y \end{bmatrix} = \begin{bmatrix} d_t \sin\theta \\ d_t \cos\theta \\ d_n \theta \end{bmatrix};$$

Figure 17:
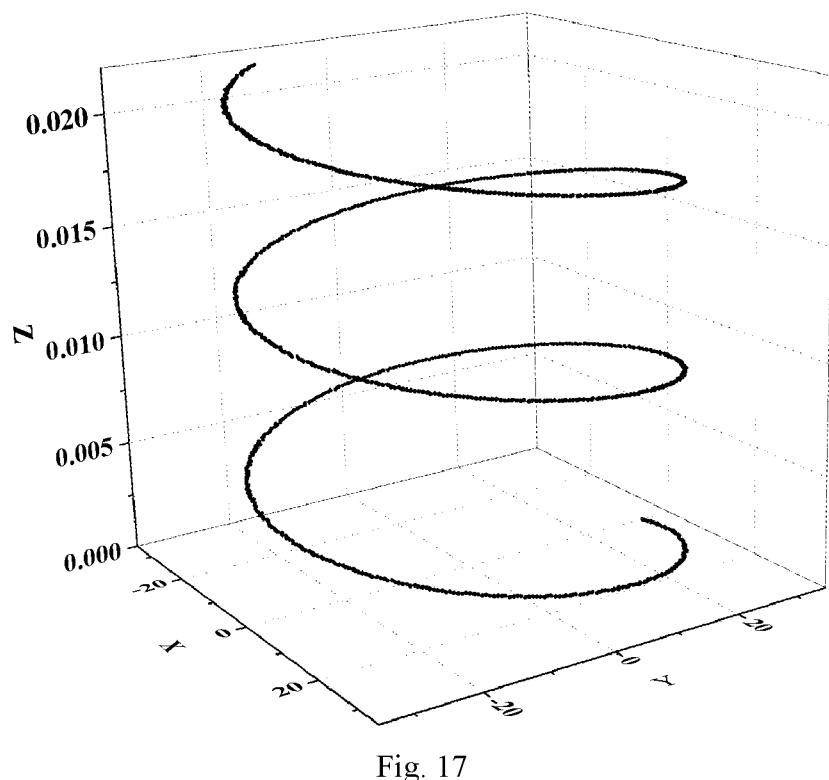
FIG. 17 is a schematic diagram of the Cartesian coordinate system measurement results of the three-dimensional surface reconstruction of the pipeline provided by the embodiment of the present invention.

In the formula, $\theta$ is the rotation angle of the sensor currently collecting; $d_n$ is the axial distance between the two collected height data. Taking the above example as the measurement parameter, the calculated results are shown in FIG. 17. In the figure, Z represents the direction of the motion axis of the linear motion module.

Figure 18:
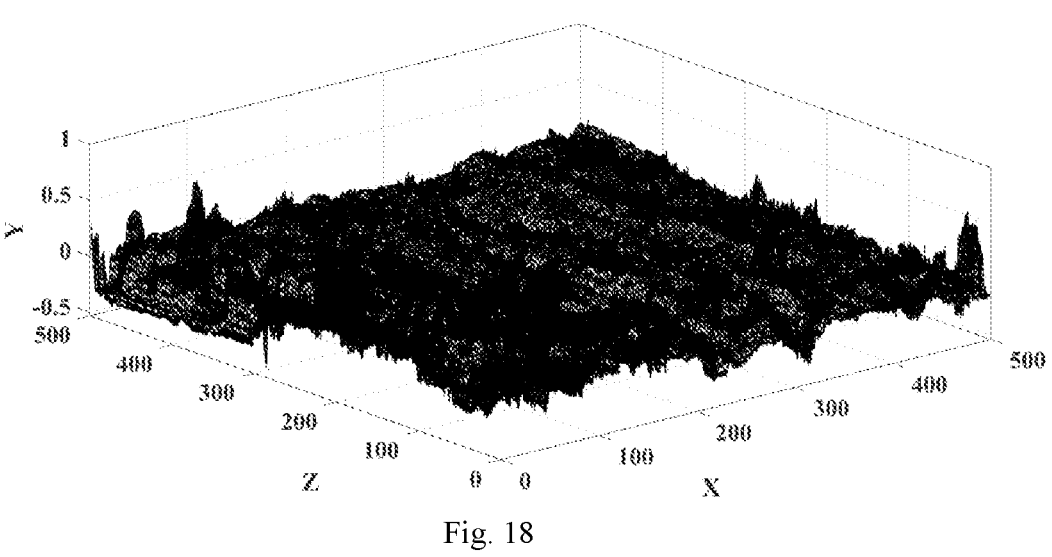
FIG. 18 is a schematic diagram of the partially enlarged results of the three-dimensional surface reconstruction measurement of the pipeline provided by the embodiment of the present invention.

In the Cartesian coordinate system, all the actual measured three-dimensional height data have been obtained, but to reconstruct the three-dimensional surface of the pipeline, a smaller acquisition step needs to be taken. In addition, the point cloud data for 3D surface reconstruction needs to have neat boundaries. Therefore, the first one adopts the cross-section measurement method, that is, when the rotating hollow spindle is rotating and measuring, the linear motion module is stationary. After the measurement is completed, it moves to the next cross-section for measurement. This is the measurement method. However, the measurement efficiency of this measurement method is too low; the three-dimensional data obtained based on the second measurement method still needs to be interpolated by establishing a grid to obtain a more complete surface result. When the feed speed of the aforementioned linear motion module is reduced in the embodiment of the present invention, the partial enlargement result of the three-dimensional surface reconstruction of the pipeline is obtained, as shown in FIG. 18.

2. Application examples. In order to prove the creativity and technical value of the technical solution of the present invention, this section is an application example of the claimed technical solution in specific products or related technologies.

Figure 12:
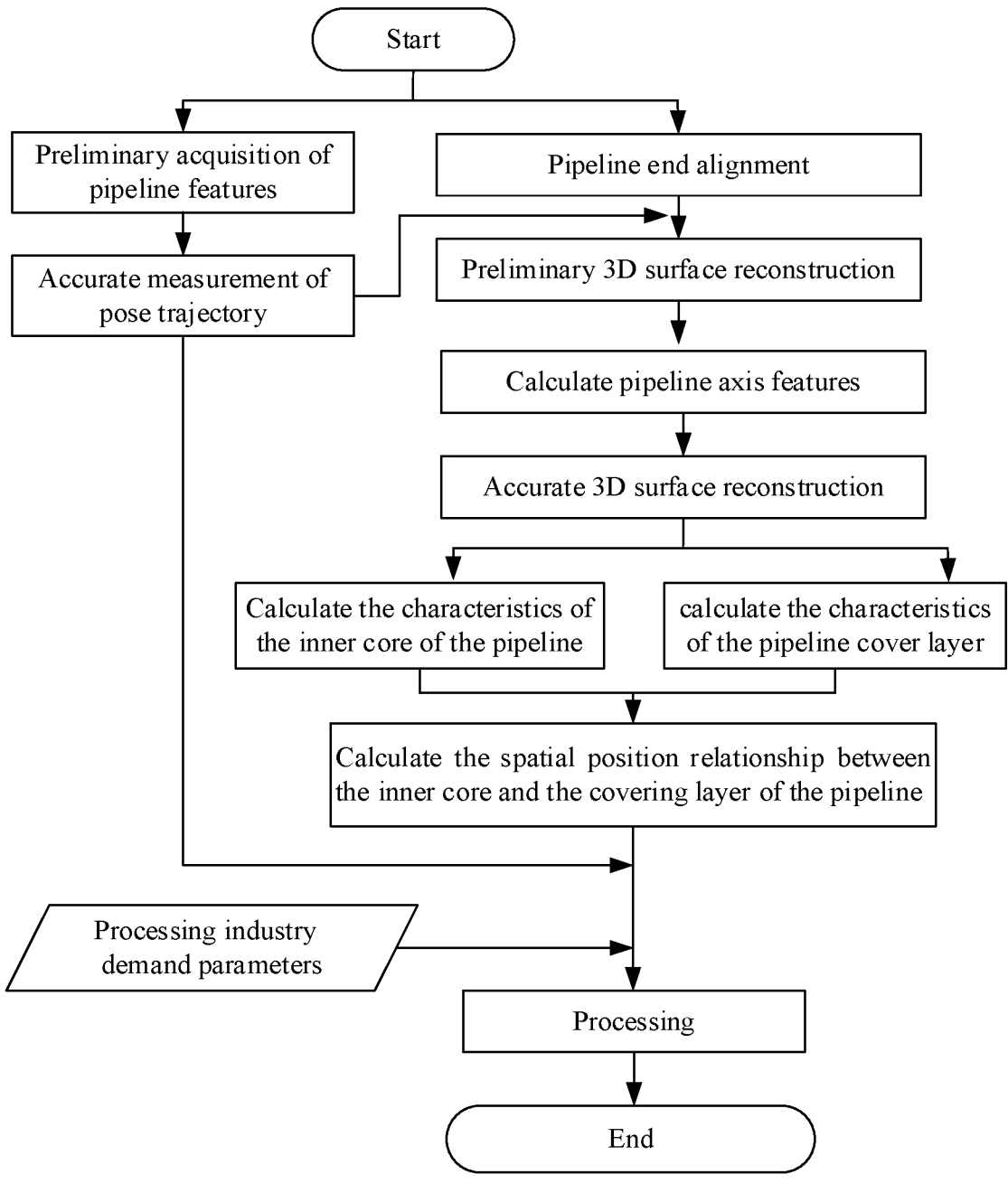
FIG. 12 is a schematic diagram of the working process of the overall on-machine measurement and machining device provided by the embodiment of the present invention.

The embodiments corresponding to FIG. 12, FIG. 13, and FIG. 19 are the actual application processes.

3. Evidence of relevant effects of the embodiment. The embodiments of the present invention have achieved some positive effects during the development or use process, and indeed have great advantages compared with the existing technology. The following content is described in conjunction with the data, charts, etc. of the test process.

FIGS. 16 to 18 are examples of measurement results based on laser displacement sensors.

The above are only specific embodiments of the present invention, but the protection scope of the present invention is not limited thereto. Any person familiar with the technical field shall, within the technical scope disclosed in the present invention, be within the spirit and principles of the present invention. Any modifications, equivalent substitutions and improvements made within the above shall be included in the protection scope of the present invention.

What is claimed is:

1. A three-dimensional profiling machining device for machining a composite material pipeline, the three-dimensional profiling machining device comprising:

a linear motion mover module;

a lifting rod installed on the linear motion mover module; and a depth vision system installed on the lifting rod;

a six-degree-of-freedom motion platform installed on an upper end of the linear motion mover module, and a hollow machining and measurement structure installed on an upper end of the six-degree-of-freedom motion platform;

a workpiece clamping column installed at a front end of the linear motion mover module wherein the composite material pipeline is installed at an end of the workpiece clamping column;

a rotating cutterhead installed on the hollow machining and measurement structure;

linear motion tables and radial motion modules installed on the rotating cutterhead, wherein one of the linear motion tables is equipped with an eddy current sensor probe that is installed via installation bolts, and another of the linear motion tables is equipped with a laser displacement sensor probe, and wherein the eddy current sensor probe is connected to a sensor premodule via a transmission cable.

2. The three-dimensional profiling machining device according to claim 1, wherein:

the hollow machining and measurement structure is provided with a support seat, and the support seat is installed on a front end of the hollow machining and measurement structure, and the support seat is fixed with a protective end cover via bolts;

the support seat is equipped with a magnetic grid sensor wiring hole, and the rotating cutterhead comprises a hollow spindle that is installed inside the hollow machining and measurement structure via a first angular contact bearing and via a second angular contact bearing, the first angular contact bearing and the second angular contact bearing are clamped by a bearing lock, the bearing lock is equipped with a lifting ring mounting hole;

the hollow machining and measurement structure is equipped with: (i) a direct drive motor wiring hole, (ii) a plug installation hole, and (iii) conductive slip ring fixing holes, wherein the conductive slip ring fixing holes fix three conductive slip ring stators; and a base is provided at a lower end of the hollow machining and measurement structure, the conductive slip ring stators are installed on the hollow spindle via screws, and the conductive slip ring stators are distributed at three positions, respectively, which positions have a phase difference relative to one another of 120°.

3. The three-dimensional profiling machining device as claimed in claim 2, wherein:

the conductive slip ring fixing holes comprise three conductive slip ring fixing holes distributed along an axial direction, and cables drawn from the conductive slip ring stators are led from the plug mounting hole to a stepper motor driver;

the conductive slip ring stators, a conductive slip ring mover, a direct drive motor stator, and a direct drive motor mover are installed inside the hollow machining and measurement structure;

a magnetic scale and a magnetic grid reading head are installed at a left end of the hollow machining and measurement structure;

cables of the direct drive motor stator and of the direct drive motor mover are connected to the driver via a direct drive motor wiring hole, and form a closed-loop motion system with the magnetic scale and the magnetic grid reading head, the magnetic grid reading head is connected to the driver via the magnetic grid sensor wiring hole; and the radial motion modules comprise three radial motion modules, each of the radial motion modules is equipped with a respective linear guide rail, a respective stepper motor, and a respective cutter, and wherein each of the cutters is installed at a respective end of the corresponding radial motion module.

4. The three-dimensional profiling machining device as claimed in claim 1, wherein:

the depth vision system is equipped with: (i) a two-dimensional pan-tilt with two degrees of freedom comprising a rotation axis and a pitch axis, (ii) a camera lens, and (iii) a heat dissipator; and the heat dissipator is installed on the camera lens.

5. The three-dimensional profiling machining device according to claim 1, wherein:

the six-degree-of-freedom motion platform is equipped with six hinges, six motion electric cylinders, and six platform bases;

each of the motion electric cylinders is installed on a respective upper end of a respective one of the platform bases, and each of the motion electric cylinders is installed on the platform via a respective one of the hinges; and the platform bases are equipped with electrical interfaces.

6. The three-dimensional profiling machining device as claimed in claim 1, wherein:

one of the linear motion tables comprises a fine-tuning screw, a sensor probe bracket, a locking knob, and a fixed base;

the sensor probe bracket has the eddy current sensor probe;

the sensor probe bracket is connected to the fixed base via a locking knob, and the sensor probe bracket is equipped with the fine-tuning screw.

* * * * *